(12) United States Patent
Amirnovin

(10) Patent No.: US 8,082,004 B2
(45) Date of Patent: Dec. 20, 2011

(54) SYSTEM AND METHOD FOR REMOVAL OF A UNIVERSAL INTEGRATED CIRCUIT CARD

(75) Inventor: Andrew Amirnovin, Bothell, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 553 days.

(21) Appl. No.: 12/274,924

(22) Filed: Nov. 20, 2008

(65) Prior Publication Data

US 2010/0124943 A1    May 20, 2010

(51) Int. Cl.
  *H04B 1/38* (2006.01)
(52) U.S. Cl. ........................ 455/558; 455/551
(58) Field of Classification Search .......... 455/558, 455/551
  See application file for complete search history.

(56) References Cited

U.S. PATENT DOCUMENTS

| | | | |
|---|---|---|---|
| 7,280,846 B2 * | 10/2007 | Lin | 455/558 |
| 2004/0127101 A1 * | 7/2004 | Zhou | 439/630 |
| 2005/0075138 A1 * | 4/2005 | Page et al. | 455/559 |
| 2008/0102895 A1 * | 5/2008 | Fernandez | 455/558 |

OTHER PUBLICATIONS

Above Board Electronics-Thomas & Betts; ABE Specialty Fastening Tools; IC Removal Tools; Internet; 2008; US.
APPLE.COM; Article HT1438; Removing SIM Card Prior to iPhone Repair; Internet; Jul. 2008; US.

* cited by examiner

*Primary Examiner* — Joseph Chang
(74) *Attorney, Agent, or Firm* — Moazzan & Associates, LLC

(57) ABSTRACT

A Universal Integrated Circuit Card (UICC), such as a Subscriber Identity Module (SIM) card is pressed into place in a wireless communication device. The SIM card includes notched edge portions that allow a tool to be used to assist in the removal of the SIM card. The notched edge portions are positioned around the periphery of the SIM card and allow a user to pry the SIM card from the wireless communication device. In an alternative embodiment, the SIM card package may include one or more holes to allow the user to insert a tool and press to remove the SIM card from the wireless communication device. In yet another alternative embodiment, the holes may be used in combination with the notched edge portions to aid in the removal of the SIM card.

15 Claims, 5 Drawing Sheets

US 8,082,004 B2

SYSTEM AND METHOD FOR REMOVAL OF A UNIVERSAL INTEGRATED CIRCUIT CARD

BACKGROUND OF THE INVENTION

1. Field of the Invention

The present invention is directed generally to a wireless communication device and, more particularly, a universal integrated circuit card (UICC) card design, such as a Subscriber Identity Module (SIM) card, to assist in the removal of the SIM card.

2. Description of the Related Art

Wireless communication devices have become commonplace. A universal integrated circuit card (UICC) card, sometimes referred to as a Subscriber Identity Module (SIM) or SIM card, securely stores service and subscriber information used to identify the subscriber on mobile telephony devices, such as computers and mobile telephones. The SIM card advantageously allows the user to change devices simply by removing the SIM card from one device and inserting it into another device. For example, a user may purchase a new cell phone. To operate the new cell phone, the user simply removes the SIM card from the old cellular telephone and inserts it into the new telephone. All subscriber identification information, such as subscriber telephone number, and other identifying information, is contained within the SIM card and thus readily transferred.

While the user may theoretically change devices readily by switching the SIM card from one device to another, the physical removal of the SIM card is often quite difficult. Because the SIM card is an electronic device, it must be securely inserted into the wireless device to provide reliable electrical contacts between the SIM card and the wireless device. The requirement of a solid connection necessitates a reliable physical connection between the SIM card and the mobile device. This may typically be provided by pressing the SIM card into place in the wireless communication device. The SIM card is typically frictionally retained within the wireless communication device. The tight fit between the SIM card and the wireless communication device makes it difficult to remove the card. Therefore, it can be appreciated that there is a significant need for a SIM card design that allows the reliable interconnection with the wireless device and yet provides for a simplified removal process. The present invention provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

The present disclosure is directed to a new universal integrated circuit card (UICC) card used in a wireless communication device. In some wireless systems, the UICC is referred to as a Subscriber Identity Module (SIM) card.

For example, the UICC is referred to as a SIM card in GSM wireless systems. In a UMTS wireless network the UICC is sometimes referred to as a USIM card. In a CDMA a wireless network, the UICC is sometimes referred to as a CSIM card. In more advanced wireless communications networks, such as a 3G network, a single UICC may run all of these applications (i.e., SIM, USIM, and CSIM). For the sake of clarity, the present disclosure will simply refer to a SIM card. However, the principles are applicable to a UICC in general.

Figure 1:
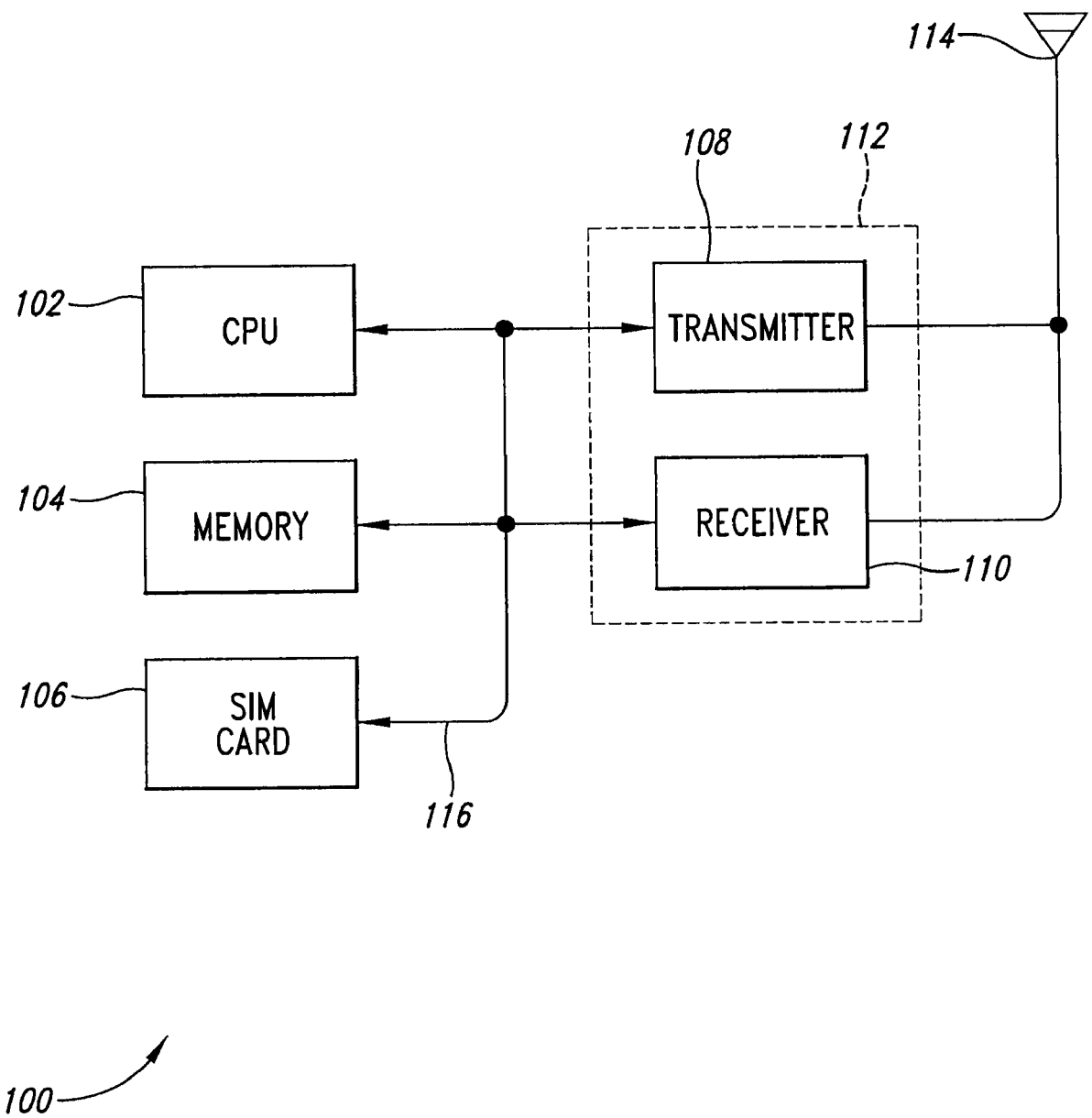
FIG. 1 is a functional block diagram illustrating selected components of a wireless communication device.

FIG. 1 is a functional block diagram of a wireless communication device 100 illustrating the function of the SIM card within the wireless communication device. The wireless communication device 100 of FIG. 1 is intended to represent many forms of wireless communication devices, including cellular telephones, personal digital assistants (PDAs), personal communication system (PCS) devices, web-enabled communication devices, wireless computers, and the like. The functional block diagram of FIG. 1 is shown in a simplified form to describe the functionality of components discussed herein.

The device 100 includes a central processing unit (CPU) 102 and a memory 104. The memory 104 may store instructions and data to control operation of the CPU 102. The memory 102 may include random access memory, read-only memory, programmable memory, flash memory, and the like. The wireless communication device 100 is not limited by any specific form of the CPU 102 or the memory 104.

FIG. 1 also illustrates a Subscriber Identity Module (SIM) card 106. The SIM card 106 is a removable card that stores user identity information. In certain systems, this may include a service subscriber identification, sometimes referred to as an international mobile subscriber identification (IMSI) as well as the mobile network number, and may also include, in some embodiments, data indicating a home location register of the particular subscriber. The SIM card 106 may also include check sum data or other error detection data, such as a parity bit. The specific information stored on the SIM card 106 may vary from one wireless carrier to another. However, the specific information stored on the SIM card 106 is not critical to a proper understanding of the present disclosure. When installed in the wireless communication device 100, the CPU 102 may treat the SIM card 106 as a portion of the memory 102 to permit the CPU to read the necessary data stored within the SIM card. In addition, the CPU 102 may alter the contents of the SIM card 106.

FIG. 1 also illustrates a transmitter 108 and receiver 110, which permit bidirectional communication between the wireless communication device 100 and a wireless communication network (not shown). In some embodiments, the transmitter 108 and receiver 110 may be formed as a transceiver 112. The transceiver 112 is coupled to an antenna 114. Operation of the transceiver 112 is well known in the art, and need not be described in greater detail herein.

The various components illustrated in FIG. 1 are coupled together by a bus system 116. The bus system 116 may include an address bus, data bus, power bus, control bus, and the like. For the sake of convenience, the various buses in FIG. 1 are illustrated as the bus system 116.

For the sake of simplicity, FIG. 1 does not illustrate other conventional components, such as audio input and output devices, a keypad, display, and the like. If the wireless communication device 100 is a wireless computer, other conventional components, such as a display, disk drive, network interface controller, and the like may also be provided. Those skilled in the art will appreciate that the wireless communication device may include these and other conventional components. These components are not shown in FIG. 1 since they are not essential to proper understanding of the SIM card 106.

Figure 2:
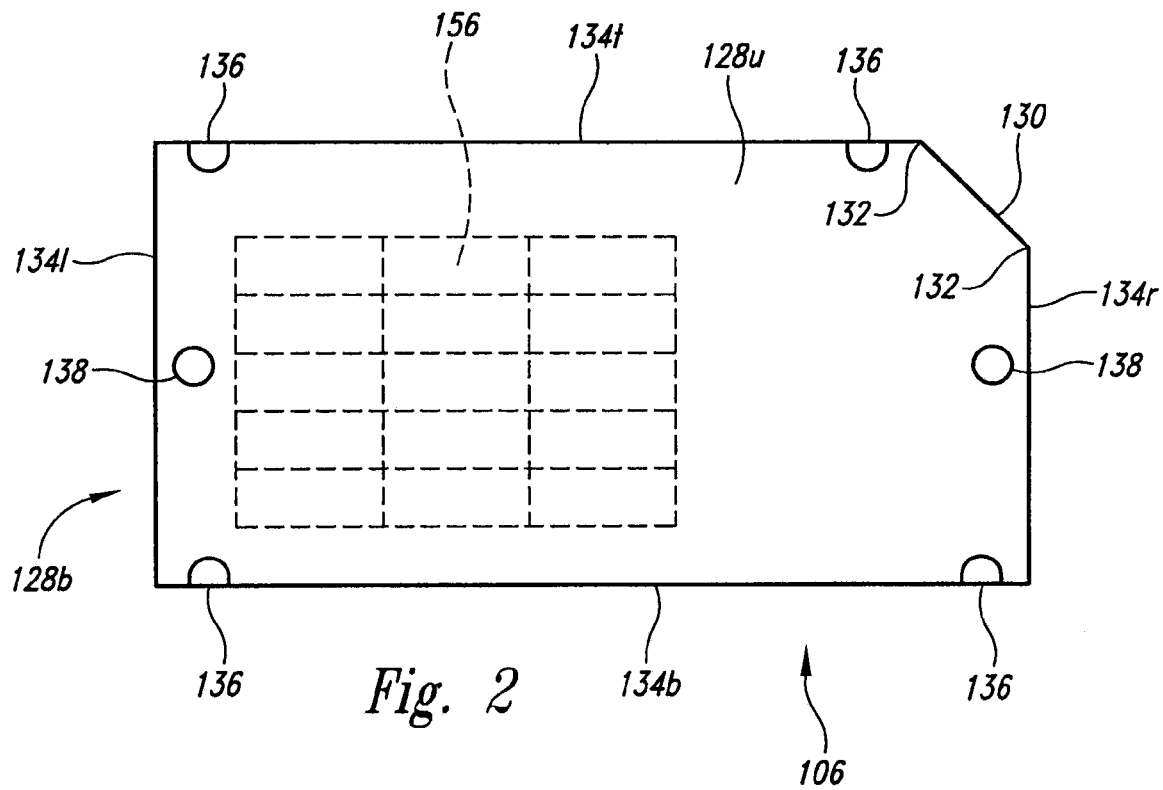
FIG. 2 is illustrates an example embodiment of a SIM card design in accordance with the present teachings.

FIG. 2 illustrates a SIM card 106 constructed in accordance with an exemplary embodiment described herein. The SIM card 106 illustrated in FIG. 2 is constructed in accordance with industry standards having dimensions of 15 millimeters (mm) by 25 mm and is approximately 0.76 mm thick. The SIM card 106 is generally rectangular in shape with a top edge 134t, a bottom edge 134b, a left edge 134l, and a right edge 134r. The SIM card 106 also has an upper surface 128u and a bottom surface 128b. As illustrated in FIG. 2, the SIM card 106 has a truncated corner 130 to assist the user in the proper orientation of the SIM card when inserting the SIM into the device 100. The truncated corner 130 has interior obtuse angles 132 formed between the truncated corner and the adjacent top edge 134t and the right edge 134r, respectively, of the SIM card 106.

FIG. 2 also illustrates, in dashed outline form, the gold-plated electrical conductors 156 affixed to the bottom surface 128b, which is illustrated, generally, by the reference arrow in FIG. 2.

As illustrated in FIG. 2, the SIM card 106 also contains one or more notched edge portions 136 formed along the perimeter of the SIM card 106 on its long edge (i.e., the top edge 134t and bottom edge 134b). In the exemplary embodiment FIG. 2, the notched edge portions 136 are roughly D-shaped and positioned approximately 1 mm of the side edges (i.e., the left edge 134l and the right edge 134r) of the SIM card 106. The notched edge portions 136 extend approximately 1 mm along the peripheral edge of the SIM card 106. Those skilled in the art will recognize that the specific shape of the notched edged portion 136, the specific location of the notched edge portion, and the specific dimensions of the notched edge portion are not critical to satisfactory operation of the SIM card 106. The size and location of the notched edge portion 136 may vary from one manufacturer to another. In general, it is desirable that the notched edge portions be in a location and have a size that will not adversely affect the structural integrity of the SIM card 106.

In operation, the notched edge portions 136 allow the user to pry the SIM card 106 from the device 100. The user may pry the SIM card 106 from the device 100 using many household items, such as a pen or pencil, paperclip, screwdriver, tweezers, or the like. The notched edge portions 136 advantageously provide an area in which to pry the SIM card 106 from the device 100 thereby simplifying the SIM card removal process and minimizing potential damage to the SIM card.

In addition to the notched edge portions 136, or in the alternative, the SIM card 106 may include apertures 138 to assist in the removal of the SIM card. In this embodiment, the apertures 138 extend all the way through the SIM card 106 from the upper surface 128u to the bottom surface 128b and allow the user to insert a tool or other household item through the aperture to push the SIM card 106 from the bottom and thereby aid in its removal from the device 100. A tool may also be inserted into one of the apertures 138 to pry the SIM card 106 from the compartment 122.

In an exemplary embodiment, the apertures 138 are located near the left and right edges 134l and 134r, respectively. One aperture 138 is located approximately 0.5 mm from the left edge 134l and approximately midway between the top edge 134t and the bottom edge 134b. Similarly, another aperture 138 is located approximately 0.5 mm from the right edge 134r. Those skilled in the art will appreciate that the precise size and location of the apertures 138 are not critical to successful operation of the SIM card 106. In general, it is desirable that the apertures 138 be of a dimension that permits the application of household items (e.g., a pen or pencil, paper clip, and the like) as noted above to aid in the removal of the SIM card 106. In addition, it is desirable that the apertures 138 be in a location that will minimize any adverse affect on the structural integrity of the SIM card 106.

In one embodiment, the user may insert a tool through the aperture 138 while simultaneously applying leveraging pressure through the notched edge portions 136 to thereby remove the SIM card 106. Thus, the aperture 138 may be used in conjunction with one or more of the notched edged portion 136 to remove the SIM card 106.

Figure 3:
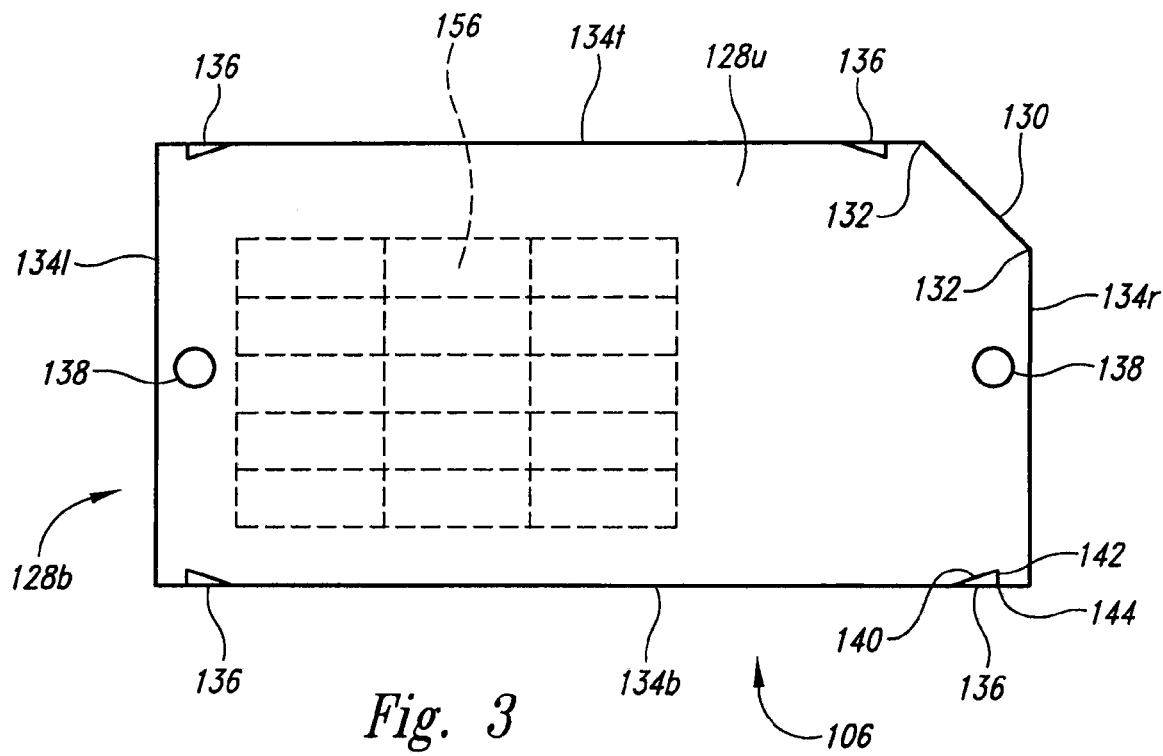
FIG. 3 is illustrates an alternative embodiment of a SIM card design.

FIG. 3 illustrates an alternative shape for the notched edge portions 136. In FIG. 3, the notched edge portions 136 are generally in the form of a right triangle. The notched edge portion 136 includes a linear tapered section 140 forming the hypotenuse of the right triangle and adjacent section 142 is formed between the linear tapered section 140 and the long edge 134l of the SIM card 106. In the embodiment illustrated in FIG. 3, the right angle 144 is formed closest to the left and right edges 134l and 134r of the SIM card 106. This allows the notched edge portions 136 closest to the right side 134r to be used during the insertion process (i.e., the insertion of the SIM card 106) into the device 100. In this embodiment, the user may utilize the notched edge portions 136 to pry the SIM card 106 into position. Similarly, the notched edge portions 136 near the left edge 134l of the SIM card 106 to pry the SIM card and thereby assist in the removal of the SIM card from the device 100. However, the notched edge portions 136 could be formed in the reverse manner with the right angle 144 being formed at the portion of the notched edge portions 136 furthest from the short edges 134s of the SIM card 106.

Figure 7C:
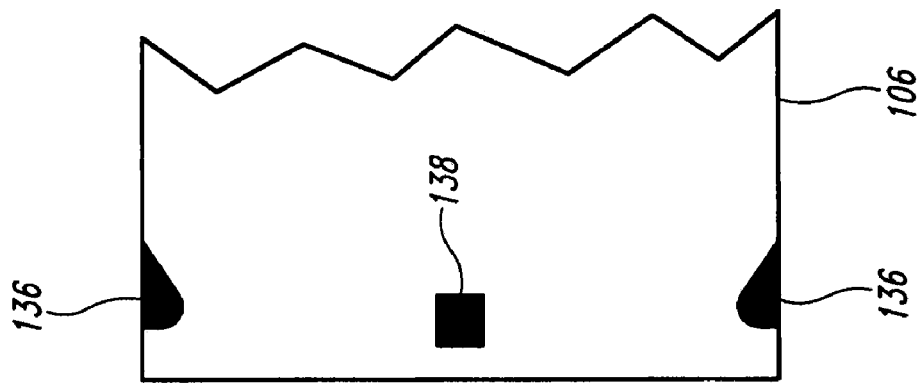
FIGS. 7A-7C illustrate alternate embodiments of a SIM card design.
Figure 7B:
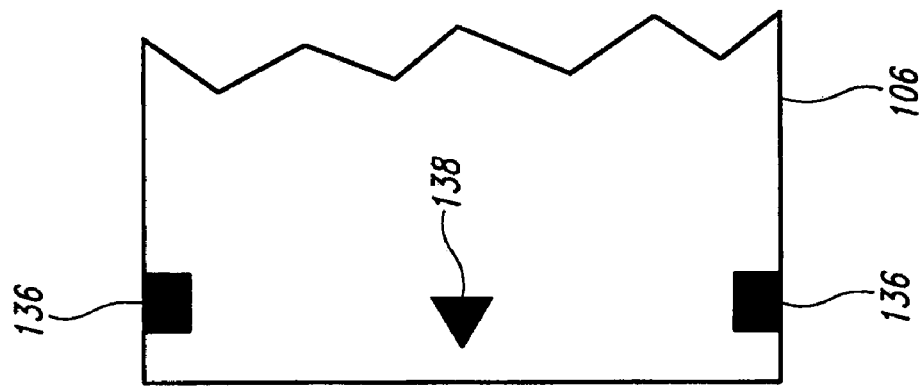
Figure 7A:
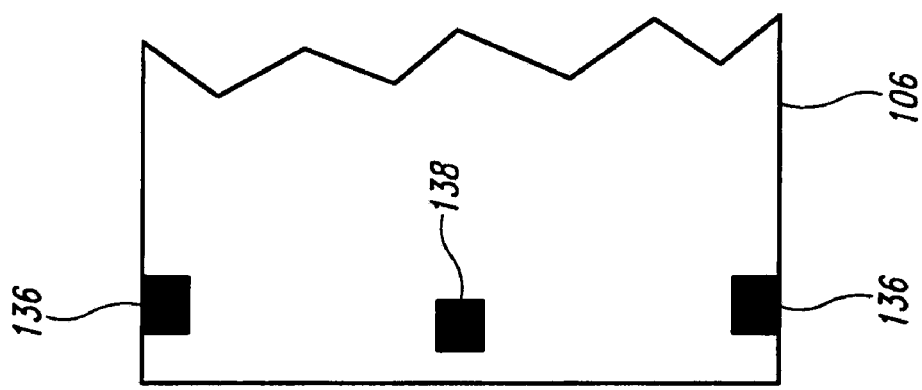

Thus, the SIM card 106 configuration illustrated in FIGS. 2-3 contains physical features that allow the user to extract the SIM from the device 100 without damaging the SIM card. Those skilled in the art will recognize that the specific shape, location and dimensions of the notched edge portion 136 and aperture 138 are not critical. FIGS. 7A-7C are partial views of the SIM 106 that provide examples of other shapes that may be satisfactorily employed. In FIG. 7A, the notched edge portions 136 and aperture 138 are implemented in a rectangular or square shape. In FIG. 7B, the notched edge portions 136 are implemented in a rectangular or square shape while the aperture 138 is implemented in a triangular shape. In FIG. 7C, the notched edge portions 136 are implemented in a curved notch shape while the aperture 138 is implemented in a rectangular or square shape. Thus, the notched edge portions 136 and aperture 138 can be implemented in a variety of shapes and sizes.

These various changes to the packaging of the SIM card 106 have no effect on the electrical functionality of the SIM. Furthermore, the holes are sufficiently small that there is no adverse effect on the structural integrity of the SIM card 106. However, the introduction of the notched edge portions 136 and/or holes 138 simplify the SIM removal process.

Figure 4:
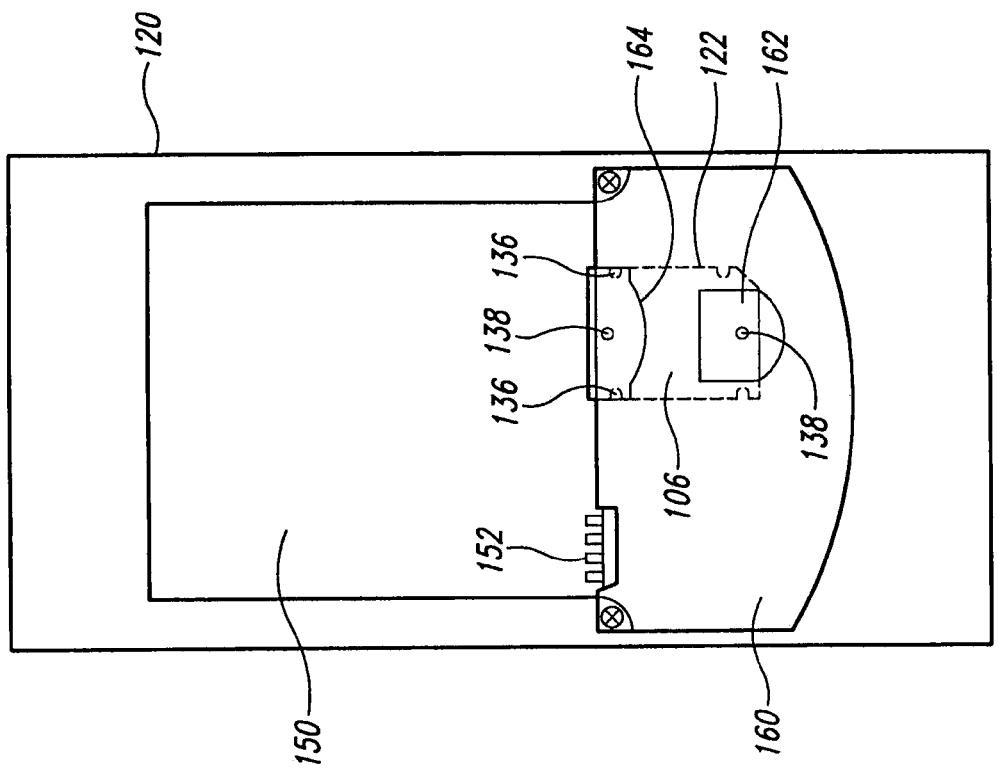
FIG. 4 illustrates a SIM card ready for insertion into a wireless communication device.
Figure 5:
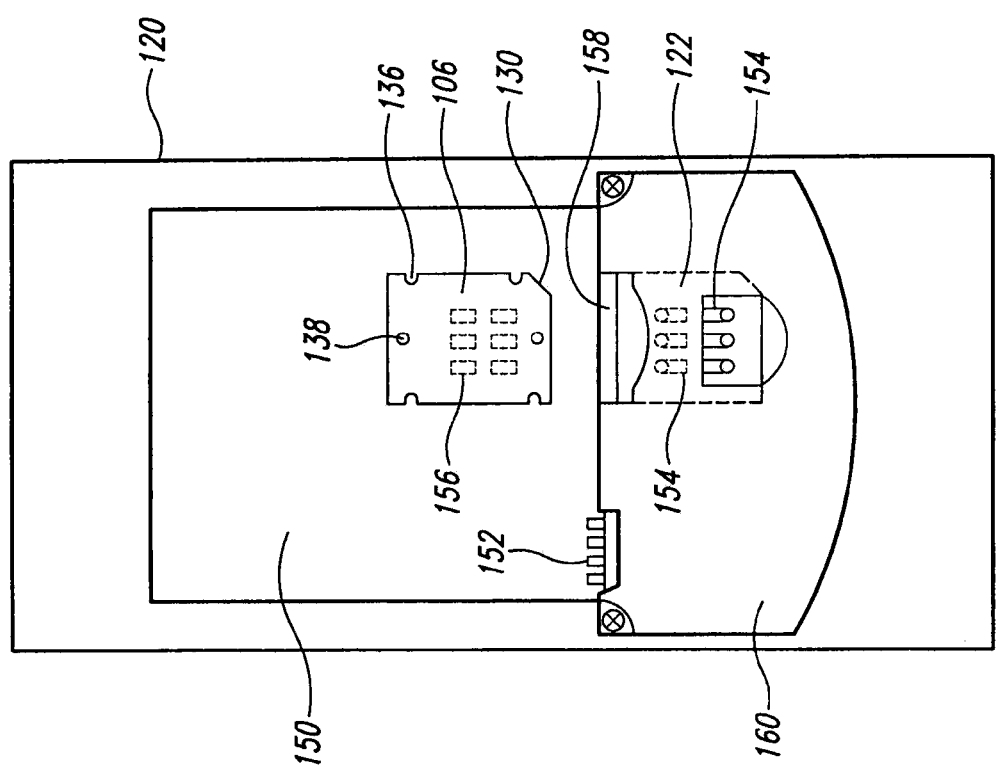
FIG. 5 illustrates a SIM card following insertion into a wireless communication device.

FIGS. 4 and 5 illustrate an example of the insertion process by which the SIM card is inserted into the wireless communication device 100. Most of the circuitry illustrated in FIG. 1, such as the CPU 102, memory 104, in transceiver 112 are contained within a housing 120. In some embodiments, the antenna 114 is also contained within the housing 120. In other embodiments, the antenna 114 may extend outside the housing 120. In the embodiment illustrated in FIGS. 4 and 5, the SIM card 106 is inserted into a compartment 122. The compartment 122 is sized to receive and frictionally retain the SIM card 106. That is, the SIM card 106 is pressed into the compartment 122. In the example illustrated in FIGS. 4 and 5, the battery (not shown) is removed from a battery compartment 150. Battery contacts 152 provide electrical connectivity between the battery and the wireless communication device 100. Electrical connectors 154 within the compartment 122 provide the necessary electrical connection between the wireless communication device 100 and the SIM card 106.

The SIM card 106 has a plurality of electrical conductors 156 that are positioned to make electrical contact with corresponding ones of the electrical connectors 154 in the wireless communication device when the SIM card 106 is fully inserted within the compartment 122. In an exemplary embodiment, the electrical connectors 154 in the wireless communication device 100 may be spring-loaded to resiliently urge the electrical connectors 154 into contact with the corresponding electrical conductors 156 on the SIM card 106. This arrangement helps provide good electrical contact between the SIM card 106 and the wireless communication device 100.

In FIG. 4, the SIM card 106 is shown in position ready for insertion into the compartment 122. The truncated corner 130 provides an indication of the proper orientation of the SIM card 106. In operation, the user slides the SIM card into the compartment 122 until the SIM card is fully seated within the compartment, as illustrated in FIG. 5. A strap 158 (see FIG. 4) also serves to retain the SIM card 106 within the compartment 122.

FIG. 5 illustrates the SIM card in its fully seated position within the compartment 122. To provide a better view of the SIM card 106 within the compartment 122, FIG. 5 is shown without the strap 158 (see FIG. 4) or the electrical connectors 154 and electrical conductors 156. A coverplate 160 also serves to help retain the SIM card 106 in place within the compartment 122. The coverplate 160 may also provide protection for circuitry within the housing 120 and may further provide electrical shielding for circuitry within the housing 120 in the exemplary embodiment figure of FIGS. 4 and 5, the coverplate 160 has a viewport 162 to allow the user to view into the compartment 122 and thereby confirm that the SIM card 106 has been fully inserted into the compartment. The coverplate 160 also has a cutaway portion 164 to assist in the insertion and removal of the SIM card 106.

As can be appreciated, once the SIM card 106 is fully inserted into the compartment 122, it can be difficult to remove without the use of the notched edge portions 136 and/or apertures 138. As best seen in FIG. 5, the SIM card 106 has at least one of the notched edge portions 136 and/or apertures 138 exposed to permit the user to pry the SIM card 106 out of the compartment 122. In operation, the user may insert a tool or conventional item (e.g., a paperclip) into the aperture 138 and slide the SIM card 106 out of its fully seated position within the compartment 122. Similarly, a tool or a household item may be inserted into one of the notched edge portions 136 to accomplish the same task. As discussed above, both the notched edge portion 136 and the aperture 138 may be used to assist in the removal of the SIM card 106.

The example illustrated in FIGS. 4 and 5 represent a broad variety of techniques used to insert the SIM card 106 into the compartment 122. Although the individual characteristics of the compartment 122 may change from one mobile communication device to another, at least a portion of the SIM card containing either a notched edge portion 136 or aperture 138 are exposed to assist the user in the removal of the SIM card.

Figure 6:
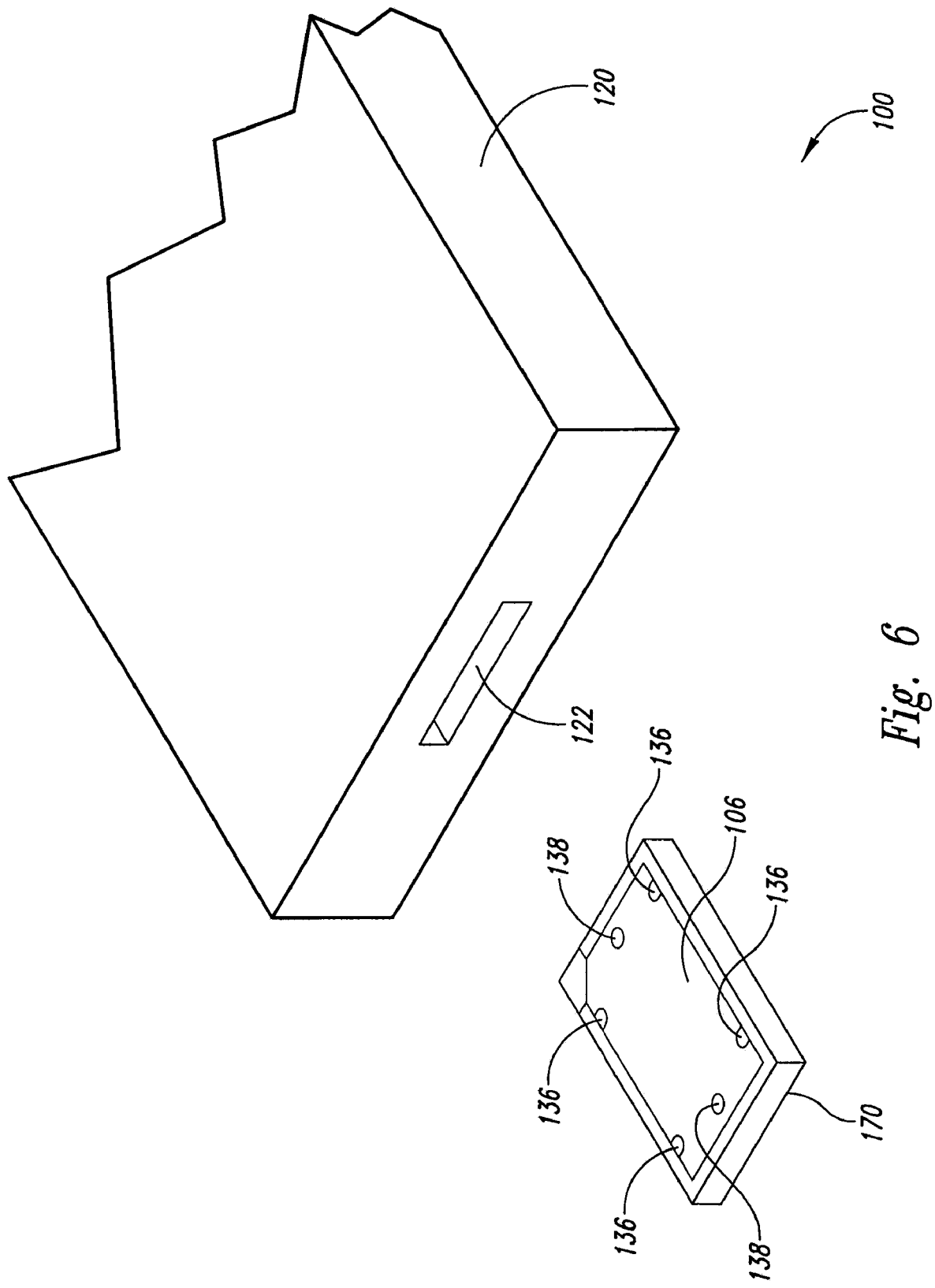
FIG. 6 is illustrates a SIM card ready for insertion into a wireless communication device using a SIM card tray.

In yet another embodiment, the SIM card 106 is inserted into a tray 170 and the tray/SIM card 106 are inserted into the compartment 122, as illustrated in FIG. 6. This arrangement eliminates the necessity of opening the housing 120 and removing the battery (not shown). However, removal of the SIM card 106 from the tray 170 may also be difficult without the use of the notched edge portions 136 and/or the apertures 138.

Thus, the notched edge portions 136 and apertures 138 assist in the removal of the SIM card 106 in a variety of different embodiments of the wireless communication device 100 and the different implementations for the housing 120.

Following the insertion of the SIM card 106 into the tray 170, the tray is inserted into compartment 122 in the housing 120. Electrical contacts (not shown) within the housing are designed to connect with corresponding electrical contacts on the SIM card 106. The tray 170 slides into the compartment 122 and is retained within the compartment by the housing 120. Various release mechanisms (not shown) are used to open the tray 170 to allow removal of the tray from the housing 120.

Reliable electrical contact between the SIM card 106 and the electrical circuitry within the housing 120 is essential for satisfactory operation of the wireless communication device 100. For this reason, the SIM card 106 is pressed firmly into position in the tray 170. In turn, the tray 170 is held firmly in position in the compartment 122 by the housing 120.

To remove the SIM card 106, the user must first remove the tray 170 from the compartment 122 in the housing 120. Various known mechanisms may be used to release the tray 170. Because the SIM card 106 is firmly pressed into the tray 170, the notched edge portion 136 and/or the apertures 138 are used in the manner described above easy removal of the SIM card 106 from the tray.

The foregoing described embodiments depict different components contained within, or connected with, different other components. It is to be understood that such depicted architectures are merely exemplary, and that in fact many other architectures can be implemented which achieve the same functionality. For example, the description directed to a SIM card is generally applicable to a UICC. Furthermore, the principles of the present disclosure could be extended generally to flash memory having a similar package configuration and facing the same difficulties in chip removal. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes"

should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A wireless communication device comprising:
   a wireless communication device housing configured to contain electronic circuitry including a transmitter and receiver, the housing having a compartment configured to receive and retain a memory card;
   a plurality of electrical connectors being positioned within the housing proximate the compartment; and
   a Universal Integrated Circuit Card (UICC) contained within a card package having electronic circuitry used in the operation of the wireless communication device, the UICC having a plurality of electrical conductors coupled to the electronic circuitry that are electrically coupled to the plurality of electrical connectors in the housing while the UICC is retained by the compartment, the card package having a notched portion in the card package along a peripheral edge of the package and an aperture positioned along and spaced apart from the peripheral edge of the card package, the aperture extending through the card package from a top surface of the card package to the bottom surface of the card package;
   wherein the notched portion of the card package and the aperture are exposed when the UICC is inserted into the compartment to thereby aid in the removal of the UICC from the compartment.

2. The device of claim 1, further comprising
   a tray sized for insertion into the compartment and retention by the housing, the tray having a receiver portion sized to receive and frictionally retain the UICC;
   wherein the UICC is pressed into the tray and frictionally retained by the tray during insertion and removal of the tray into the compartment and wherein the notched portion of the card package is exposed when the card is inserted into the tray to thereby aid in the removal of the card from the tray.

3. The device of claim 1, further comprising a plurality of notched portions in the UICC package along a peripheral edge of the package wherein at least one of the plurality of notched portions of the card package is exposed when the UICC is inserted into the compartment to thereby aid in the removal of the UICC from the compartment.

4. The device of claim 1 wherein the notched portion is along a first peripheral edge of the card package, the card package having a second peripheral edge of the card package parallel to the first peripheral edge, the device further comprising a second notched portion in the card package along the second peripheral edge of the package wherein at least one of the plurality of notched portions of the card package is exposed when the UICC is inserted into the compartment to thereby aid in the removal of the UICC from the compartment.

5. The device of claim 1 wherein the notched portion in the card package has a shape selected from a group of shapes comprising a generally semi-circular shape, a generally triangular shape, a rectangular shape, a square shape, and a curved notch shape.

6. The device of claim 1 wherein the aperture in the card package has a shape selected from a group of shapes comprising a generally circular shape, a generally triangular shape, a rectangular shape, and a square shape.

7. The device of claim 1, further comprising a plurality of apertures positioned along and spaced apart from the peripheral edge of the card package, each of the plurality of apertures extending through the card package from a top surface of the card package to the bottom surface of the card package wherein at least one of the plurality of apertures is exposed when the UICC is inserted into the compartment to thereby aid in the removal of the UICC from the compartment.

8. A Universal Integrated Circuit Card (UICC) for insertion into a compartment of a wireless communication device sized to fit and frictionally retain the UICC, the UICC comprising:
   electronic circuitry used in the operation of a wireless communication device;
   a card package configured to house the electronic circuitry;
   a first notched portion in the card package along a peripheral edge of the card package; and
   an aperture positioned along and spaced apart from the peripheral edge of the card package, the aperture extending through the card package from a top surface of the card package to the bottom surface of the card package;
   wherein the first notched portion and the aperture of the card package are exposed when the card package is inserted into the compartment to thereby aid in the removal of the UICC from the compartment.

9. The device of claim 8, further comprising a plurality of notched portions in the card package along a peripheral edge of the card package wherein at least one of the plurality of notched portions of the card package is exposed when the UICC is inserted into the compartment to thereby aid in the removal of the card package from the compartment.

10. The device of claim 8 wherein the first notched portion is along a first peripheral edge of the card package, the card having a second peripheral edge of the card package parallel to the first peripheral edge, the device further comprising a second notched portion in the card package along the second peripheral edge of the package wherein at least one of the first and second notched portions of the card package is exposed when the UICC is inserted into the compartment to thereby aid in the removal of the UICC from the compartment.

11. The device of claim 8 wherein the notched portion in the card package has a shape selected from a group of shapes comprising a generally semi-circular shape, a generally triangular shape, a rectangular shape, a square shape, and a curved notch shape.

12. The device of claim 8 wherein the aperture in the card package has a shape selected from a group of shapes comprising a generally circular shape, a generally triangular shape, a rectangular shape, and a square shape.

13. The device of claim 8, further comprising a plurality of apertures positioned along and spaced apart from the peripheral edge of the card package, each of the plurality of apertures extending through the card package from a top surface of the card package to the bottom surface of the card package wherein at least one of the plurality of apertures is exposed when the UICC is inserted into the compartment to thereby aid in the removal of the UICC from the compartment.

14. A Universal Integrated Circuit Card (UICC) card for insertion into a compartment of a wireless communication device sized to fit and frictionally retain the UICC, the UICC comprising:
    electronic circuitry used in the operation of a wireless communication device;
    a card package configured to house the electronic circuitry; and
    an aperture positioned along and spaced apart from a peripheral edge of the card package, the aperture extending through the card package from a top surface of the card package to the bottom surface of the card package wherein the aperture is exposed when the UICC is inserted into the compartment to thereby aid in the removal of the UICC from the compartment.

15. A method for removing a Universal Integrated Circuit Card (UICC) card from a compartment of a wireless communication device sized to fit and frictionally retain the UICC, the method comprising:
    inserting a tool into one of an exposed notch along a peripheral edge of the UICC and an aperture positioned along and spaced apart from a peripheral edge of the card package, the aperture extending through the card package from a top surface of the card package to the bottom surface of the card package; and
    exerting a force on the tool to dislodge the UICC from its full inserted position in the compartment.

\* \* \* \* \*